(12) United States Patent
Upadhyay

(10) Patent No.: US 8,392,989 B2
(45) Date of Patent: Mar. 5, 2013

(54) ANTI-MALWARE SCANNING IN PARALLEL PROCESSORS OF A GRAPHICS PROCESSING UNIT

(75) Inventor: Janardan Upadhyay, Maharashtra (IN)

(73) Assignee: Nvidia Corporation, Santa Clara, CA (US)

( * ) Notice: Subject to any disclaimer, the term of this patent is extended or adjusted under 35 U.S.C. 154(b) by 373 days.

(21) Appl. No.: 12/573,886

(22) Filed: Oct. 6, 2009

(65) Prior Publication Data
US 2011/0083184 A1 Apr. 7, 2011

(51) Int. Cl.
*G06F 21/00* (2006.01)
(52) U.S. Cl. .......................................... 726/22; 713/188
(58) Field of Classification Search ........................ None
See application file for complete search history.

(56) References Cited

U.S. PATENT DOCUMENTS

| 7,694,150 B1 * | 4/2010 | Kirby | 713/188 |
|---|---|---|---|
| 2006/0242710 A1 * | 10/2006 | Alexander | 726/24 |
| 2010/0138376 A1 * | 6/2010 | Avis et al. | 706/50 |

* cited by examiner

*Primary Examiner* — Gilberto Barron, Jr.
*Assistant Examiner* — Izunna Okeke
(74) *Attorney, Agent, or Firm* — Raj Abhyanker, P.C.

(57) ABSTRACT

A method of anti-malware scanning includes providing, in a computing system including a central processor, a multimedia processor including a number of processors to operate in parallel with one another. The anti-malware scanning further includes executing an anti-malware algorithm using the multimedia processor to free the central processor for a non-anti-malware related task.

20 Claims, 5 Drawing Sheets

ANTI-MALWARE SCANNING IN PARALLEL PROCESSORS OF A GRAPHICS PROCESSING UNIT

FIELD OF TECHNOLOGY

This disclosure relates generally to anti-malware scanning and, more particularly, to a method, an apparatus, and a system to provide anti-malware scanning in a parallel processing environment.

BACKGROUND

Anti-malware scanning in a computing system may involve processing using a Central Processing Unit (CPU) of the computing system. The CPU may execute an anti-malware algorithm on files stored in a non-volatile storage (e.g., hard drive) of the computing system sequentially, i.e., one file at a time. The file Input/Output (I/O) speed may be limited, for example, by a Serial Advanced Technology Attachment (SATA) or an Integrated Drive Electronics (IDE) attachment. Until data arrives from a memory of the computer system, the CPU may be unable to analyze the data, regardless of the availability of a large memory and/or processing power.

The abovementioned sequential execution of the anti-malware algorithm by the CPU may lead to a long time being taken for the completion of the scanning process.

SUMMARY

Disclosed are a method, an apparatus, and a system to provide anti-malware scanning in parallel processors of a Graphics Processing Unit (GPU).

In one aspect, a method of anti-malware scanning is disclosed. The method includes providing, in a computing system including a central processor, a multimedia processor including a number of processors to operate in parallel with one another. The method further includes executing an anti-malware algorithm using the multimedia processor to free the central processor for a non-anti-malware related task.

In another aspect, a method of anti-malware scanning is disclosed. The method includes providing, in a computing system including a central processor, a multimedia processor including a number of processors to operate in parallel with one another, and storing one or more known malware signature(s) in a cache memory of the multimedia processor. The method also includes loading, using the central processor, a data corresponding to a maximum capacity of a memory of the computing system to be processed in parallel by the multimedia processor, and scanning the data using the multimedia processor for one or more known malware based on one or more known malware signature(s) and/or a new malware.

In yet another aspect, a computing system is disclosed. The computing system includes a central processor and a multimedia processor including a number of processors to operate in parallel with one another. The multimedia processor is used to execute an anti-malware algorithm to free the central processor for a non-anti-malware related task The methods and system disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are methods and a system to provide anti-malware scanning in parallel processors of a Graphics Processing Unit (GPU). Although the present embodiments have been described with reference to specific example embodiments, it will be evident that various modifications and changes may be made to these embodiments without departing from the broader spirit and scope of the various embodiments.

Figure 1:
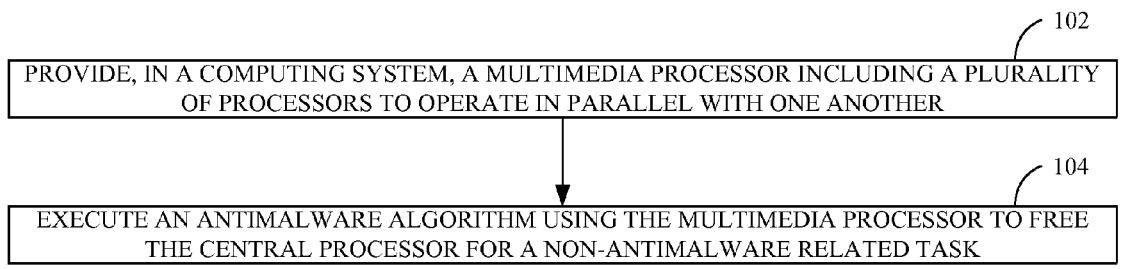
FIG. 1 is a process flow diagram detailing the operations involved in a method of anti-malware scanning, according to one or more embodiments.

FIG. 1 is a process flow diagram detailing the operations involved in a method of anti-malware scanning, according to one or more embodiments. In operation 102, a multimedia processor including a number of processors capable of operating in parallel with one another may be provided in a computing system. In one or more embodiments, the multimedia processor may operate at a frequency (e.g., 150 MHz) lower than that of a central processor (e.g., 650 MHz) of the computing system. In one or more embodiments, the multimedia processor of the computing system may be a Graphics Processing Unit (GPU), and the central processor may be a Central Processing Unit (CPU). In one or more embodiments, the anti-malware scanning may involve execution of an anti-malware algorithm using the multimedia processor in operation 104. In one or more embodiments, the aforementioned utilization of the anti-malware algorithm using the multimedia processor may free the central processor for other non-anti-malware related tasks.

In one or more embodiments, the anti-malware scanning may include one or more of a signature based detection technique, a malicious activity based detection technique, and a heuristic based detection technique. The signature based detection technique may involve comparison of contents of a file to a dictionary of malware signatures. In one or more embodiments, as the malware may be embedded in the existing file, the entire file may be searched not only as a whole, but also in parts. In one or more embodiments, the signature based anti-malware algorithm may be executed when the file is created, closed, opened, and/or e-mailed using the operating system of the computing system. In one or more embodiments, the signature based anti-malware algorithm may be scheduled to be executed at a particular date and time to scan all the files on the non-volatile storage (e.g., hard disk) of the computing system for possible infection by malware.

Malicious activity based detection technique may involve monitoring the computing system for suspicious program behavior. In one or more embodiments, the suspicious behavior may be flagged by the anti-malware algorithm, and a user alert may be generated. Due to the capability of raising false alarms, the generated user alert may be ignored, and, therefore, malware, whose signatures are not included in the dictionary of known malware signatures, may infect the computing system.

Heuristic based detection may be used to identify unknown viruses by either file analysis or file emulation. In one or more embodiments, file analysis may include executing the anti-malware algorithm to flag a file as a malware or a non-malware based on a determination as to whether a program included in the file is malicious or not. The aforementioned determination may be done by analyzing the instructions of the program. In one or more embodiments, file emulation may involve separation of the file operation into a virtual system environment, where, based on the actions taken by the file, tagging/non-tagging of the file as a malware may be done.

In one or more embodiments, the anti-malware algorithm may be executed to protect the computing system against a computer virus, a trojan, a malicious e-mail content, a phishing attack, a worm, an unwanted application, a rootkit, and/or spyware. In one or more embodiments, the anti-malware algorithm may also update the dictionary of malware signatures based on the detection of the new malware. In one or more embodiments, the infected files may be quarantined prior to repair and/or deletion.

In one or more embodiments, the execution of the anti-malware algorithm on the multimedia processor instead of the central processor of the computing system may lead to large time savings. For example, even for small home computing systems, a malware scanning time of 6-8 hours may be required to scan 40-80 GB of the hard disk. In the case of large systems involving Terabytes (TB) of data, the time required for scanning may be 4-6 days. This may be due to the tediousness of the scanning process that involves reading a file from a secondary memory to a primary memory of the computing system, executing the malware algorithm on the central processor, and generating an exception when a malicious program is detected. In one or more embodiments, the scanning of TB of data using the multimedia processor may reduce the time by ~95%. In one or more embodiments, as the multimedia processor operates at a frequency lower than that of the central processor of the computing system, power dissipated during the execution of the anti-malware algorithm may also be reduced.

Figure 2:
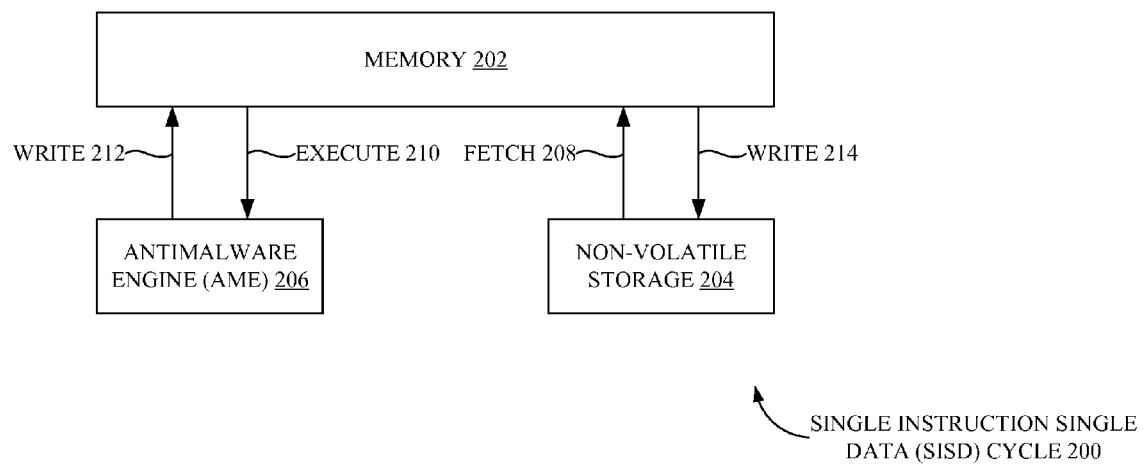
FIG. 2 is a schematic view of a Single Instruction Single Data (SISD) cycle involved in anti-malware scanning using a central processor of a computing system, according to one or more embodiments.

FIG. 2 is a schematic view of a Single Instruction Single Data (SISD) cycle involved in anti-malware scanning using a central processor of a computing system, according to one or more embodiments. In one or more embodiments, the SISD cycle 200 may involve data (e.g., a file) from a non-volatile storage 204 (e.g., hard drive) of the computing system being obtained through a data fetch 208 process prior to the data being stored in the memory 202 of the computing system. In one or more embodiments, the memory 202 may be a volatile memory (e.g., Random Access Memory (RAM)), and the central processor may be a CPU. In one or more embodiments, instructions associated with the anti-malware algorithm may be fetched from the memory 202 of the computing system using the central processor. The instructions may then be decoded and interpreted. In one or more embodiments, data to be scanned by the anti-malware algorithm may then be fetched from the memory 202 based on the instructions.

In one or more embodiments, the central processor may be used to execute the instructions involved in the anti-malware algorithm using an anti-malware engine (AME) 206 in the execute 210 process, and the result of the execution may be written to the memory 202 of the computing system or a device external to the computing system (e.g., a floppy disk) in a write 212 process. In one or more embodiments, the result of the aforementioned execution stored in the memory 202 of the computing system may then be written to the non-volatile storage 204 of the computing system during the data write 214 process.

In one or more embodiments, the abovementioned central processor-centric anti-malware scanning process may operate in a sequential manner, leading to a lot of time being wasted in computations and/or the sequential I/O operations involved in data fetching from the non-volatile storage of the computing system. In one or more embodiments, the scanning process may, therefore, only be performed file-by-file.

Figure 3:
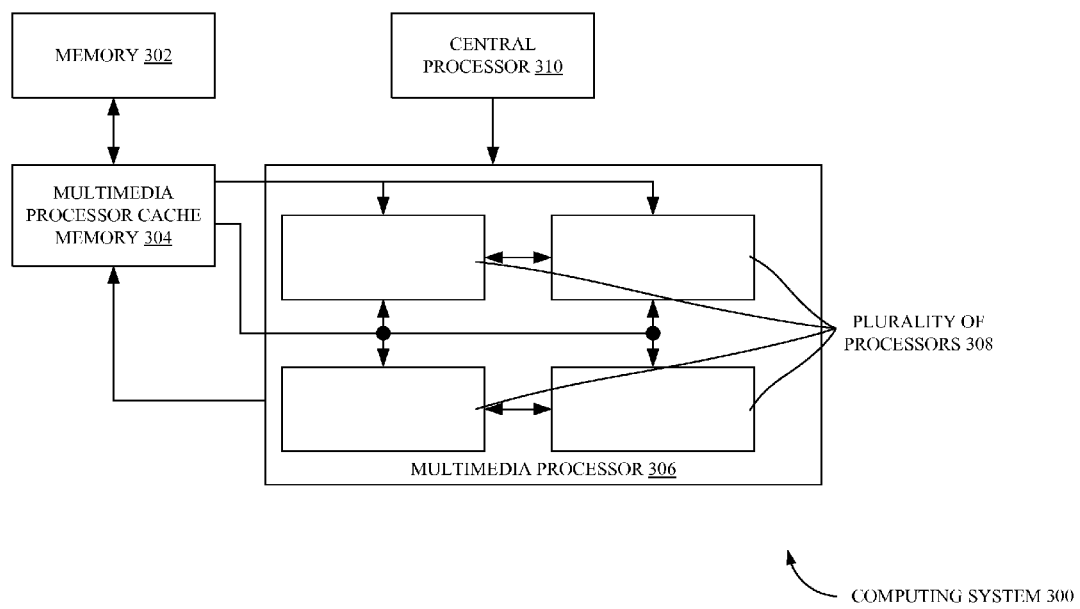
FIG. 3 is a schematic view of a computing system using a multimedia processor to execute an anti-malware algorithm, according to one or more embodiments.

FIG. 3 is a schematic view of a computing system 300 using a multimedia processor 306 to execute an anti-malware algorithm, according to one or more embodiments. In one or more embodiments, a requisite data to be scanned for malware may be copied from a memory 302 of the computing system 300 to a multimedia processor cache memory 304 associated with the multimedia processor 306. In one or more embodiments, the central processor 310 may instruct processing of the data to be scanned for malware using the multimedia processor 306. In one or more embodiments, the multimedia processor 306 may execute the anti-malware algorithm associated with the anti-malware scanning concurrently on each of a constituent plurality of processors 308 thereof. In one or more embodiments, the data associated with the anti-malware scanning may be accessed from the multimedia processor cache memory 304 during the execution of the anti-malware algorithm. In one or more embodiments, the result of the execution of the anti-malware algorithm may be stored in the multimedia processor cache memory 304, and then copied to the memory 302 of the computing system 300.

In one or more embodiments, a number of malware signatures may also be stored in the multimedia processor cache memory 304 to facilitate easy access of the malware signatures during the anti-malware scanning process. In one or more embodiments, the multimedia processor cache memory 304 may be updated with a new malware signature based on the detection of a new malware.

In one or more embodiments, the parallel architecture of the multimedia processor 306 may allow for a chunk of data (i.e., 1000-10000 files) to be loaded in one instruction cycle. For example, maximum memory allocation (e.g., 512 MB of RAM) may be provided to the data to be loaded and executed in one cycle. In one or more embodiments, a command may be issued in one read cycle for fetching the large chunk of data. Therefore, in one or more embodiments, the size of data may be increased in one cycle, leading to an increase in processing speed. In one or more embodiments, the central processor 310 may issue the read and write commands of a fetch cycle as the multimedia processor 306 may not be programmed to issue the same in a parallel processing environment. In one or more embodiments, the offloading of the execution process by the central processor 310 to the multimedia processor 306 may free the central processor 310 for other non-anti-malware related tasks.

In one or more embodiments, the abovementioned fetch and write cycles may be performed by the central processor 310 with maximum supported data. In one or more embodiments, the storage of malware signatures in the multimedia processor cache memory 304 instead of the memory 302 of the computing system 300 may provide for improved performance of the anti-malware scanning process.

In one or more embodiments, data to be scanned for malware may be fetched one sector at a time in a sequential order from a non-volatile storage of the computing system 300. In one or more embodiments, a sector may be divided further in order to enable fetching the data in the non-volatile storage of the computing system 300 to correspond to a pre-allocated location thereof in the memory 302 of the computing system 300.

Figure 4:
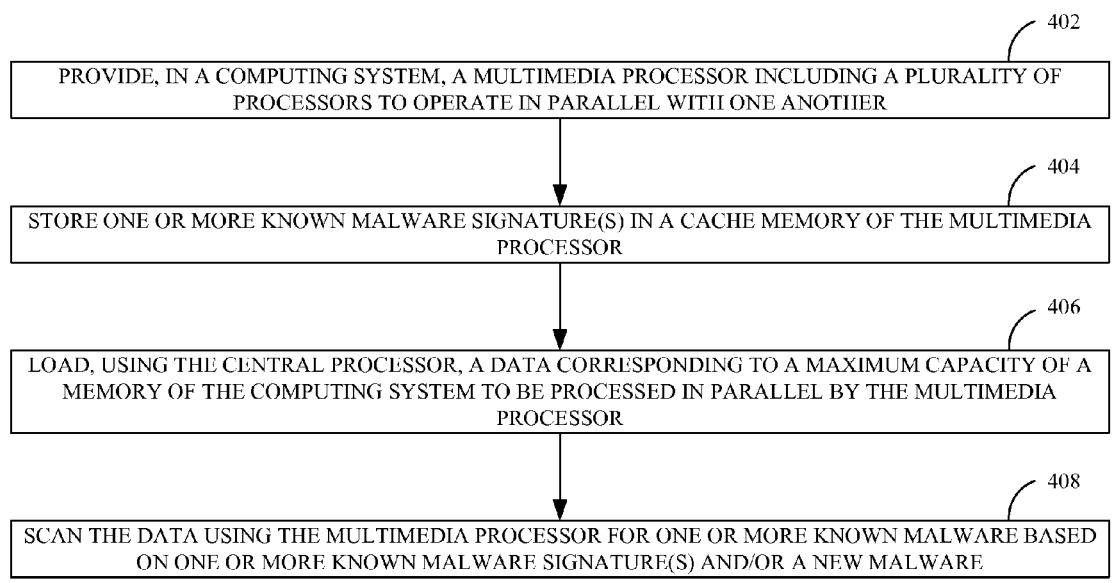
FIG. 4 is a process flow diagram detailing the operations involved in an anti-malware scanning process based on maximum data fetching, according to one or more embodiments.

FIG. 4 is a process flow diagram detailing the operations involved in an anti-malware scanning process based on maximum data fetching, according to one or more embodiments. In operation 402, a multimedia processor 306 including a number of processors 308 to operate in parallel with one another may be provided in a computing system 300. In one or more embodiments, operation 404 may involve storing one or more known malware signature(s) in a cache memory 304 of the multimedia processor 306. In one or more embodiments, the central processor 310 may be used in operation 406 to load a data corresponding to a maximum capacity of a memory 302 of the computing system 300 to be processed in parallel by the multimedia processor 306. In one or more embodiments, the data may be scanned in operation 408 using the multimedia processor 306 for one or more known malware based on one or more known malware signature(s) and/or a new malware.

In one or more embodiments, the central processor 310 of the computing system 300 may be a multi-core processor (e.g., Intel® Pentium® dual-core processor). In one or more embodiments, the multimedia processor 306 may include a number of Single Instruction Multiple Data (SIMD) processors as the number of processors 308.

Figure 5:
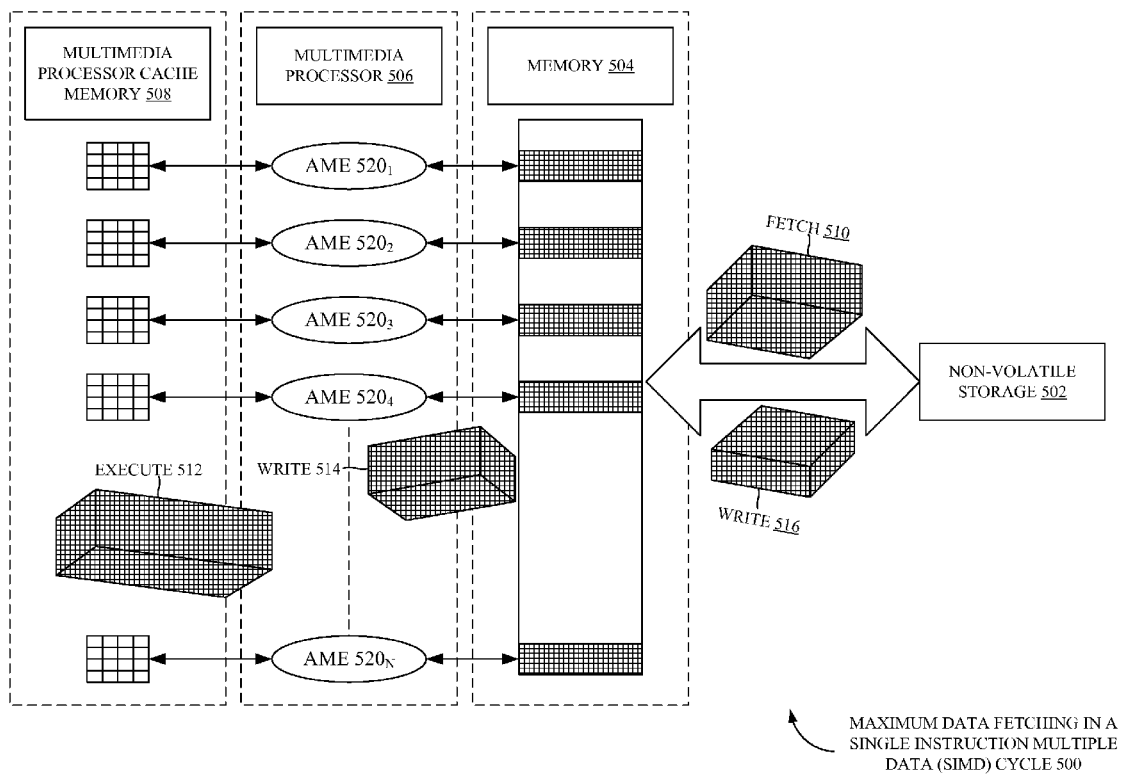
FIG. 5 illustrates maximum data fetching using a multimedia processor in a Single Instruction Multiple Data (SIMD) cycle, according to one or more embodiments.

FIG. 5 illustrates maximum data fetching using a multimedia processor 504 in a Single Instruction Multiple Data (SIMD) cycle 500, according to one or more embodiments. In one or more embodiments, the box-checked blocks in FIG. 5 may indicate constituent blocks of a large chunk of data in a memory 504 of the computing system 300 to be scanned for malware. In one or more embodiments, the large chunk of data may correspond to a maximum capacity of the memory 504 of the computing system 300. In one or more embodiments, the SIMD cycle 500 may involve data (e.g., 1000-10000 files) from a non-volatile storage 502 (e.g., hard disk) of the computing system 300 being obtained through a data fetch 510 process controlled by the central processor 310. In one or more embodiments, known malware signatures may be stored in a multimedia processor cache memory 508. In one or more embodiments, anti-malware scanning using the multimedia processor 506 may be done by utilizing multiple AMEs $520_1$-$520_N$, associated with a plurality of processors, operating in parallel. In one or more embodiments, the AMEs $520_1$-$520_N$ may include pre-defined instructions and/or commands to be executed on the data.

Each block (shown with intersecting horizontal and vertical lines in FIG. 5) of the multimedia processor cache memory 508 may refer to a block of data in the multimedia processor cache memory 508 employed during the anti-malware scanning process. In one or more embodiments, the anti-malware algorithm may be executed using the multimedia processor 506 and the multimedia processor cache memory 508, as represented by the execute 512 process. In one or more embodiments, the result of the concurrent anti-malware scanning process may be written to the memory 504 of the computing system 300, as represented by the write 514 process. In one or more embodiments, the central processor 310 may write the result of the anti-malware scanning process to the non-volatile storage 502 of the computing system 300, as represented by the write 516 process.

In one or more embodiments, the data fetch 510 process may also be controlled using the multimedia processor 506. Therefore, in one or more embodiments, the data fetch 510, the execute 512, and the write 514 processes may all be controlled by the multimedia processor 506. In one or more embodiments, effects of improvements in an anti-malware algorithm by way of accelerating the scanning process may be multiplied manifold due to the above-mentioned concurrent anti-malware scanning process. In one or more embodiments, the computing system 300 may be clustered with another computing system 300 including a multimedia processor 306 to further reduce the time involved in the anti-malware scanning process.

Although the present embodiments have been described with reference to specific example embodiments, it will be evident that various modifications and changes may be made to these embodiments without departing from the broader spirit and scope of the various embodiments. For example, the computing system 300 of FIG. 3 may involve structural modifications of constituent elements that are well within the scope of the various embodiments. Also, for example, the various devices and modules described herein may be enabled and operated using hardware circuitry (e.g., CMOS based logic circuitry), firmware, software or any combination of hardware, firmware, and software. For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of anti-malware scanning comprising:
providing, in a computing system including a central processor, a multimedia processor comprising a plurality of processors to operate in parallel with one another;
fetching data to be scanned for malware from a non-volatile storage of the computing system one sector at a time in a sequential order;
dividing a sector to enable fetching the data to be scanned for malware from the non-volatile storage of the computing system to correspond to a pre-allocated location thereof in a memory of the computing system;
copying the data to be scanned for malware into a cache memory of the multimedia processor through loading a chunk thereof in one instruction cycle, the chunk of the data corresponding to a maximum capacity of the memory of the computing system;
instructing, through the central processor, the multimedia processor to scan the data for malware therethrough; and
executing, through the multimedia processor in the same one instruction cycle, an anti-malware algorithm capable of both scanning the data for at least one known malware based on at least one known malware signature stored in the cache memory of the multimedia processor and updating the cache memory with a signature of a new malware based on detection thereof during the scanning of the data using the multimedia processor in accordance with the instruction through the central processor to free the central processor for a non-anti-malware related task.

2. The method of claim 1, further comprising:
fetching an instruction from the memory of the computing system using the central processor prior to executing the anti-malware algorithm using the multimedia processor; and
writing a result of the execution of the anti-malware algorithm using the central processor to one of the memory of the computing system and a device external to the computing system.

3. The method of claim 1, comprising executing the anti-malware algorithm using the multimedia processor based on at least one of a signature based detection technique, a malicious activity detection technique, and a heuristic based detection technique.

4. The method of claim 1, comprising providing a plurality of Single Instruction Multiple Data (SIMD) processors as the plurality of processors.

5. The method of claim 1, comprising controlling fetching of the data from the non-volatile storage of the computing system using the multimedia processor.

6. The method of claim 1, wherein the central processor of the computing system is a Central Processing Unit (CPU), and the multimedia processor of the computing system is a Graphics Processing Unit (GPU).

7. The method of claim 1, comprising executing the anti-malware algorithm to protect the computing system against at least one of a computer virus, a trojan, a malicious e-mail content, a phishing attack, a worm, an unwanted application, a rootkit, and a spyware.

8. The method of claim 1, further comprising clustering the computing system with another computing system also comprising a multimedia processor.

9. The method of claim 1, wherein an operating frequency of the multimedia processor is less than that of the central processor.

10. The method of claim 1, wherein the memory of the computing system is a volatile memory.

11. A method of anti-malware scanning comprising:
providing, in a computing system including a central processor, a multimedia processor comprising a plurality of processors to operate in parallel with one another;
storing at least one known malware signature in a cache memory of the multimedia processor;
fetching data to be scanned for malware from a non-volatile storage of the computing system one sector at a time in a sequential order;
dividing a sector to enable fetching the data to be scanned for malware from the non-volatile storage of the computing system to correspond to a pre-allocated location thereof in a memory of the computing system;
loading, using the central processor, a chunk of data of the data to be scanned for malware corresponding to a maximum capacity of the memory of the computing system in a single instruction cycle into the cache memory to be processed in parallel by the multimedia processor; and
in response to an instruction from the central processor, providing a capability to the multimedia processor to both:
scan the chunk of data for at least one known malware based on the stored at least one known malware signature; and
update the cache memory with a signature of a new malware based on detection thereof during scanning the chunk of data
in the same single instruction cycle.

12. The method of claim 11, comprising controlling fetching of the data from the non-volatile storage of the computing system using the multimedia processor.

13. The method of claim 11, wherein the chunk of data corresponding to the maximum capacity of the memory of the computing system includes a plurality of files stored in the non-volatile storage of the computing system.

14. The method of claim 11, wherein the central processor of the computing system is a multi-core processor.

15. The method of claim 11, comprising scanning the chunk of data for at least one of a computer virus, a trojan, a malicious e-mail content, a worm, a phishing attack, an unwanted application, a rootkit, and a spyware.

16. A computing system comprising:
a central processor; and
a multimedia processor comprising:
a plurality of processors to operate in parallel with one another; and
a cache memory communicatively coupled to the plurality of processors, the cache memory including at least one known malware signature stored therein, the multimedia processor being configured to control fetching of data to be scanned for malware from a non-volatile storage of the computing system one sector at a time in a sequential order, and dividing a sector to enable fetching the data to be scanned for malware from the non-volatile storage of the computing system to correspond to a pre-allocated location thereof in a memory of the computing system, the central processor being configured to instruct the multimedia processor to scan the data for malware therethrough, and the multimedia processor, in accordance with the instruction, further being configured to copy the data into the cache memory thereof based on loading a chunk of the data corresponding to a maximum capacity of the memory of the computing system in one instruction cycle and to execute an anti-malware algorithm capable of both scanning the data for at least one known malware based on the at least one known malware signature stored in the cache memory and updating the cache memory with a signature of a new malware based on detection thereof during the scanning of the data in the same one instruction cycle to free the central processor for a non-anti-malware related task.

17. The computing system of claim 16, wherein the anti-malware algorithm utilizes data comprising a plurality of files stored in the non-volatile storage of the computing system.

18. The computing system of claim 16, wherein the computing system is a part of a computer cluster including at least one other computing system.

19. The computing system of claim 16, wherein the central processor is configured to load the data corresponding to a maximum capacity of the memory of the computing system to be processed in parallel by the multimedia processor for the malware related scanning.

20. The computing system of claim 16, wherein the multimedia processor is used to control a data write process of writing a result of the execution of the anti-malware algorithm to the memory of the computing system.

* * * * *